(12) United States Patent
Liang

(10) Patent No.: US 7,719,210 B2
(45) Date of Patent: *May 18, 2010

(54) CONSTANT BRIGHTNESS CONTROL FOR ELECTRO-LUMINESCENT LAMP

(75) Inventor: Chih-Ping Liang, Hsinchu (TW)

(73) Assignee: CeeLight, Inc., Colmar, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,426

(22) Filed: Apr. 28, 2008

(65) Prior Publication Data
US 2008/0265792 A1 Oct. 30, 2008

Related U.S. Application Data

(63) Continuation of application No. 11/727,275, filed on Mar. 26, 2007, now Pat. No. 7,372,216.

(60) Provisional application No. 60/788,040, filed on Apr. 3, 2006.

(51) Int. Cl.
G05F 1/00 (2006.01)
(52) U.S. Cl. ............... 315/308; 315/291; 315/224; 315/247; 315/274
(58) Field of Classification Search ............... 315/224, 315/247, 246, 225, 307–311, 291, 297
See application file for complete search history.

(56) References Cited

U.S. PATENT DOCUMENTS

| | | | |
|---|---|---|---|
| 2,908,806 A | 10/1959 | Cohen | |
| 3,056,897 A | 10/1962 | Knochel et al. | |
| 3,548,254 A | 12/1970 | Pahlavan | |
| 3,566,391 A | 2/1971 | Lally | |
| 3,573,532 A | 4/1971 | Boucher | |
| 3,651,319 A | 3/1972 | Norris et al. | |
| 3,694,645 A | 9/1972 | Brantz | |
| 3,992,874 A | 11/1976 | Collins | |
| 4,017,155 A | 4/1977 | Yagi et al. | |
| 4,053,813 A | 10/1977 | Kornumpf et al. | |
| 4,135,959 A | 1/1979 | Luo et al. | |
| 4,144,557 A | 3/1979 | Kerr, III et al. | |
| 4,161,018 A | 7/1979 | Briggs et al. | |
| 4,214,296 A | 7/1980 | Magett | |
| 4,284,317 A | 8/1981 | Doyle | |
| 4,338,547 A | 7/1982 | McCaslin | |
| 4,343,032 A | 8/1982 | Schwartz | |
| 4,629,267 A | 12/1986 | Stepan | |

(Continued)

FOREIGN PATENT DOCUMENTS

WO 2007/126737 11/2007

(Continued)

*Primary Examiner*—Tuyet Vo
(74) *Attorney, Agent, or Firm*—Connolly Bove Lodge & Hutz LLP

(57) ABSTRACT

A ballast (11) includes a variable output DC converter source (12) and an inverter circuit (14) arranged to provide AC output voltage to an electro-luminescent (EL) lamp (16). A Q factor of EL lamp can characterize the age of the EL lamp. A series resonance-parallel loaded circuit and two voltage detector (18, 20) are constructed to measure the Q factor. A processor (17) controls the output of DC voltage source in accordance with a look-up table containing constant brightness algorithm based on the derived voltage and Q relationship.

15 Claims, 1 Drawing Sheet

U.S. PATENT DOCUMENTS

| | | | |
|---|---|---|---|
| 4,823,240 A | 4/1989 | Shenker |
| 4,853,594 A | 8/1989 | Thomas |
| 4,857,013 A | 8/1989 | Peters |
| 4,943,886 A | 7/1990 | Quazi |
| 4,963,788 A | 10/1990 | King et al. |
| 5,083,065 A | 1/1992 | Sakata et al. |
| 5,128,595 A | 7/1992 | Hara |
| 5,309,062 A | 5/1994 | Perkins et al. |
| 5,337,224 A | 8/1994 | Field et al. |
| 5,381,310 A | 1/1995 | Brotz |
| 5,444,310 A | 8/1995 | Kataoka et al. |
| 5,444,330 A | 8/1995 | Leventis et al. |
| 5,493,182 A | 2/1996 | Sowa et al. |
| 5,515,247 A | 5/1996 | Cheung et al. |
| 5,525,870 A | 6/1996 | Matsuzawa et al. |
| 5,550,433 A | 8/1996 | Tobler |
| 5,552,009 A | 9/1996 | Zager et al. |
| 5,563,473 A | 10/1996 | Mattas et al. |
| 5,585,694 A | 12/1996 | Goldburt et al. |
| 5,608,614 A | 3/1997 | Ohnishi et al. |
| 5,608,715 A | 3/1997 | Yokogawa |
| 5,638,339 A | 6/1997 | DeLoretto et al. |
| 5,677,602 A | 10/1997 | Paul et al. |
| 5,712,528 A | 1/1998 | Barrow et al. |
| 5,732,979 A | 3/1998 | Finke |
| 5,739,645 A | 4/1998 | Xia et al. |
| 5,749,646 A | 5/1998 | Brittell |
| 5,816,682 A | 10/1998 | Marischen |
| 5,833,508 A | 11/1998 | Chien |
| 5,836,671 A | 11/1998 | Chien |
| 5,902,688 A | 5/1999 | Antoniadis et al. |
| 5,926,440 A | 7/1999 | Chien |
| 5,965,980 A | 10/1999 | Hagiwara et al. |
| 6,034,481 A | 3/2000 | Haynes |
| 6,054,725 A | 4/2000 | Liedenbaum et al. |
| 6,065,848 A | 5/2000 | Tucker et al. |
| 6,082,867 A | 7/2000 | Chien |
| 6,082,868 A | 7/2000 | Carpenter |
| 6,100,478 A | 8/2000 | LaPointe et al. |
| 6,106,135 A | 8/2000 | Zingale et al. |
| 6,107,735 A | 8/2000 | Hora |
| 6,144,156 A | 11/2000 | Lutschounig et al. |
| 6,158,868 A | 12/2000 | Chien |
| 6,160,346 A | 12/2000 | Vlegger |
| 6,168,841 B1 | 1/2001 | Chen |
| 6,170,958 B1 | 1/2001 | Chien |
| 6,177,768 B1 | 1/2001 | Kamata et al. |
| 6,179,432 B1 | 1/2001 | Zhang et al. |
| 6,198,060 B1 | 3/2001 | Yamazaki et al. |
| 6,250,773 B1 | 6/2001 | Lai |
| 6,254,260 B1 | 7/2001 | Wang et al. |
| 6,265,043 B1 | 7/2001 | Vinyard |
| 6,271,631 B1 | 8/2001 | Burrows |
| 6,280,809 B1 | 8/2001 | Wang et al. |
| 6,302,559 B1 | 10/2001 | Warren |
| 6,326,735 B1 | 12/2001 | Wang et al. |
| 6,347,877 B1 | 2/2002 | Douglass, II |
| 6,471,365 B2 | 10/2002 | Wang et al. |
| 6,513,951 B1 | 2/2003 | Wang et al. |
| 6,545,232 B1 | 4/2003 | Huo-Lu |
| 6,554,442 B2 | 4/2003 | Chou |
| 6,561,671 B2 | 5/2003 | Wang et al. |
| 6,562,431 B2 | 5/2003 | Wang et al. |
| 6,601,964 B2 | 8/2003 | Wang et al. |
| 6,686,549 B2 | 2/2004 | Douzono et al. |
| 6,743,993 B1 | 6/2004 | Clark et al. |
| 7,057,125 B1 | 6/2006 | Tsai |
| 7,071,433 B2 | 7/2006 | Holscher |
| 7,148,937 B2 | 12/2006 | Rankin, Jr. et al. |
| 7,235,752 B1 | 6/2007 | Chen et al. |
| 2002/0068141 A1 | 6/2002 | Pieper |
| 2004/0113567 A1 | 6/2004 | Yamauchi et al. |
| 2005/0275347 A1 | 12/2005 | Liang et al. |
| 2006/0006818 A1 | 1/2006 | Fishbein et al. |
| 2006/0055346 A1 | 3/2006 | Ohta et al. |
| 2006/0055679 A1 | 3/2006 | Grinshpoon et al. |
| 2006/0087262 A1 | 4/2006 | Kim et al. |
| 2006/0261748 A1 | 11/2006 | Nukisato et al. |
| 2007/0247085 A1 | 10/2007 | Yao et al. |

FOREIGN PATENT DOCUMENTS

| | | |
|---|---|---|
| WO | 2007/126738 | 11/2007 |
| WO | 2007/126739 | 11/2007 |

CONSTANT BRIGHTNESS CONTROL FOR ELECTRO-LUMINESCENT LAMP

CROSS-REFERENCE TO RELATED APPLICATION

This application is a continuation of U.S. patent application Ser. No. 11/727,275 filed on Mar. 26, 2007, now U.S. Pat. No. 7,372,216 which claims the benefit of the earlier filing date of U.S. Provisional Application No. 60/788,040, filed on Apr. 3, 2006, each of which is incorporated by reference herein in its respective entirety.

FIELD OF THE INVENTION

The invention relates to Electro-luminescent (EL) lamps and, more particularly, to a ballast circuit for adjusting an EL lamp to a substantially constant brightness.

BACKGROUND OF THE INVENTION

Electro-luminescent (EL) lamps are used often for backlighting. The advantages of the EL lamp include its thinness, its light weight and flexibility. The disadvantage of the use of an EL lamp is that these phosphor based lamps dim with age as the phosphor decays. To overcome this effect, the voltage or frequency applied to the lamp can be increased to cause the phosphor to light be brighter, thus compensating for the reduction in light emission from the decay.

There are several approaches for compensating for the phosphor decay. One approach is to use a constant power driver circuit to compensate life. As the EL lamp decays, the reduced capacitance result in lower deriving current and deriving power. A constant power deriving circuit could increase output voltage as the lamp ages, but it is not possible to maintain constant output brightness, since there is no measurable parameter to indicate how much the lamp has aged.

Automatic brightness control systems include optical feedback using a monitoring photocell which is currently the most effective method to measure and control the brightness output. Based on a reading, the voltage and frequency supplied to the EL lamp are adjusted. In this way, the lamp brightness output can be controlled and maintain constant. This method has many inherent problems: it is expensive, it is affected by surrounding ambient light, it needs a response calibration based on the specific application and the optical monitoring device must be appropriately mounted close to the EL lamp.

Another method to compensate for reduced brightness of an EL lamp is to configure a digital circuit which includes a microprocessor, a timer and ROM. A table in ROM represents the relationship between the appropriate derive voltage and on-time to produce the constant brightness required. The microprocessor will track the total on-time of EL lamp and select appropriate data from table from the deriving EL lamp. However, as the EL lamp changed or expired, the timer should be reset. This open loop control system is not effective for an EL lamp.

Thus, there is a need to provide a simple, measurable parameter to indicate the age of the EL lamp and use this parameter to maintain the required constant brightness.

SUMMARY OF THE INVENTION

An object of the invention is to fulfill the need referred to above. In accordance with the principles of the present invention, this objective is obtained by providing a ballast for controlling brightness of an electro-luminescent (EL) lamp. The ballast includes a converter circuit that converts line AC voltage to a DC input voltage. An inverter circuit inverts the DC input voltage to an AC output voltage. The ballast is constructed and arranged to provide the AC output voltage to the EL lamp. An input voltage detector is constructed and arranged to measure the DC input voltage (Vin). An output voltage detector is constructed and arranged to measure the AC output voltage (Vout). A processor is constructed and arranged to adjust Vin based on measured values of Vout and Vin to thereby adjust brightness of the EL lamp.

In accordance with another aspect of the invention, a method is provided for controlling brightness of an electro-luminescent (EL) lamp. The method provides a ballast for powering the EL lamp. DC input voltage (Vin) to the ballast is measured. AC output voltage (Vout) from the ballast is measured. Based on measured values of Vout and Vin, Vin is adjusted to thereby adjust brightness of the EL lamp.

Another object of the invention is to provide a method to control of the end of lamp life enabling the ability to shut-off the lamp. In order to maintain constant output brightness of lamp, the deriving voltage increases as the lamp ages. If the deriving voltage reaches a limit of the withstanding voltage of the lamp, breakdown will occur between layers of the lamp. As the deriving voltage reaches a limit value, a controller stops compensation or shuts-off the ballast to protect the lamp.

Another object of the invention is to provide the ability to change the brightness setting at any time with an automatic recalculation of the lamp's decay parameters.

Another object of the invention is to provide the ability to utilize the ballast on different sized lamps (within the ballast specification ranges) and have the ballast automatically understand the brightness parameters.

Another object of the invention is to provide the ability to reuse the ballast as the lamps are changed or expire.

Another object of the invention is to provide the ability to receive a manual (brightness control knob or switch, etc) request to change brightness or an automated (program command) request for a required brightness setting and adjust accordingly and maintain the brightness requirement.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawing in which.

DETAILED DESCRIPTION OF THE EXEMPLARY EMBODIMENT

Figure 1:
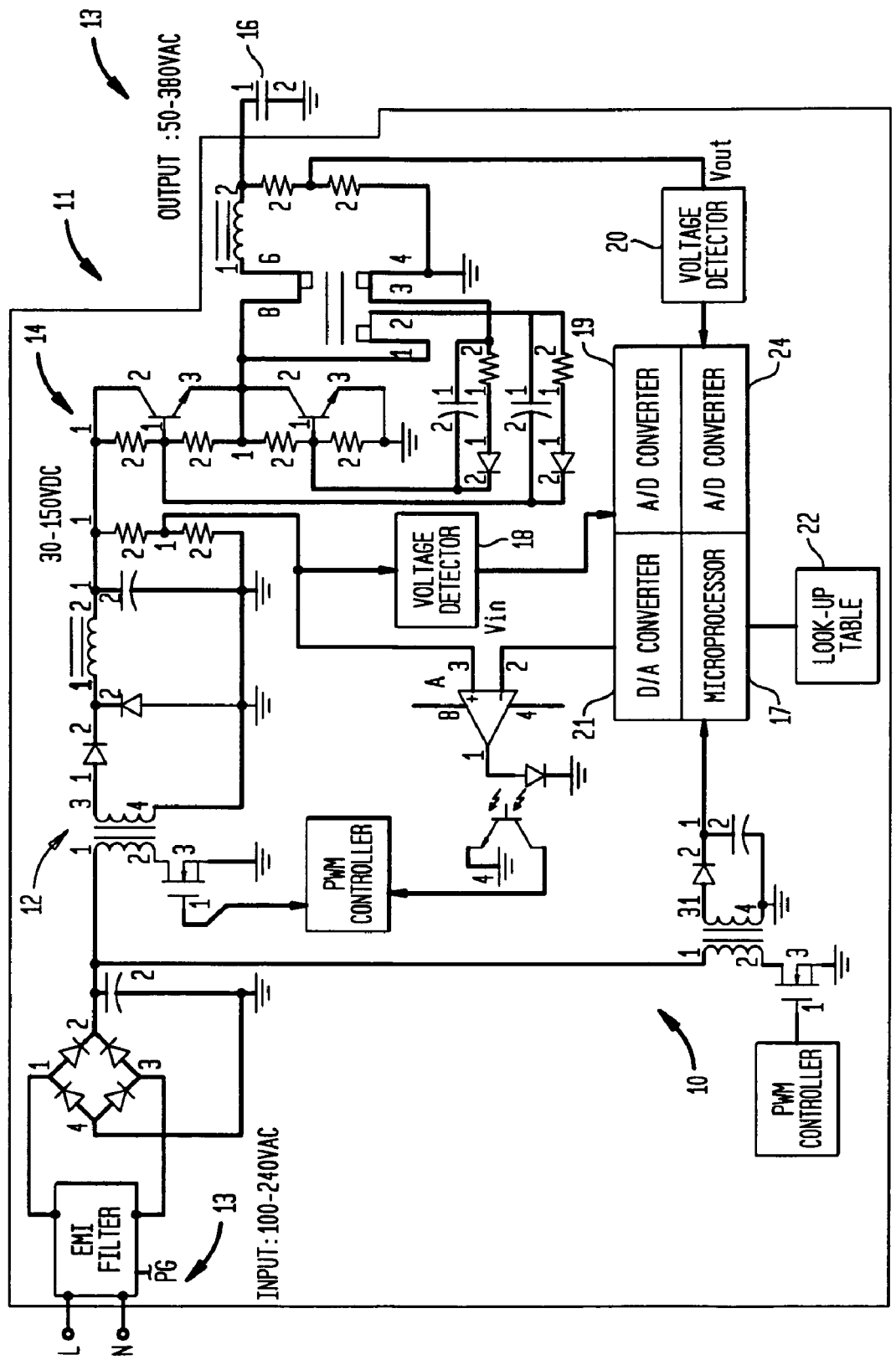
FIG. 1 is a schematic of a system for a controlling brightness of an EL lamp, provided in accordance with the principles of the invention.

The object of the invention is to provide a simple and efficient system for adjusting an EL lamp to a given constant brightness. By measuring a quality "Q" factor, referring to a look up table, and using a predetermined algorithm which relates the Q factor to the brightness setting, complete control of the brightness of the EL Lamp is possible.

An LCR resonator circuit that generates a sinusoidal waveform voltage is a well known circuit in a conventional ballast to derive fluorescence of a lamp. A series resonant-parallel loaded circuit could be applied to a deriving EL lamp. The transfer function is $$Vin/Vout = (1 - (Ws/W0)^2 + (Ws/W0Q)^2)^{1/2}$$

Where

Vout: output voltage of resonator,

Vin: input voltage to resonator,

Ws: deriving frequency,

W0: natural resonance frequency,

Q: quality factor of lamp,

As the lamp decays its Q value will increase because of the reduction of capacitance. If the deriving frequency is equal to natural resonance frequency, the output voltage, Vout=Vin*Q. By measuring Vout and Vin, the obtained Q factor could indicate how much the EL lamp has aged. Usually, the Q factor of the EL lamp is related to layer structure and material and is independent of lamp size. A ballast constructed with the above circuit can derive different size lamps without changing an algorithm in a microprocessor.

With reference to FIG. 1, a circuit, generally indicated at 10, for controlling brightness of an EL lamp 16, is shown in accordance with the principles of the present invention. The circuit 10 is preferably part of a ballast 11 for powering the EL lamp 16. The ballast 11 and the EL lamp 16 define an EL lamp system, generally indicated at 13. The ballast 11 has a circuit that is composed of two stages. The first stage 12 is an AC to DC converter which converts line voltage (e.g., 100-240 VAC) at input 13 to DC voltage (e.g., 30-150 VDC). The second stage is a DC to AC inverter 14 which is a half bridge, self excited, series resonance-parallel loaded circuit. The inverter 14 inverts DC voltage to AC voltage (50-380 VAC rms, at a predetermined frequency, for example 1000 Hz) that is applied to the EL lamp 16.

A look-up table 22 is established to provide a constant brightness algorithm based on the measured values of the Vin and Q relationship. Thus, the table identifies the relationship between the age of the EL lamp 16 and the Q value. In other words, once the Q value is determined, the age of the EL lamp 16 can be determined. In order to maintain a constant output brightness of an aged EL lamp 16, the output voltage (Vout) must be increased. Since Vout is proportional to Vin, a formula regarding brightness is derived from this table 22 based on the relationship between the Q value and Vin. The table 22 can be in memory in a controller or microprocessor 17 or can be in memory separate from, but accessible by the microprocessor 17. The algorithm executed by the microprocessor 17 utilizes the measured AC-DC converter 12 output voltage (Vin) and the inverter 14 output voltage (Vout), calculates the Q value, and then adjusts Vin according to the brightness required using a compensating formula. For example, every minute, the microprocessor will calculate the Q value and adjust Vin to maintain a substantially constant output brightness according to the look-up table (e.g., based age of the EL lamp 16).

A/D converters 19 and 24 convert the analog signals Vin and Vout, respectively, to digital signals that are received by the microprocessor 17. A D/A converter 21 is provided to convert the digital output of the microprocessor 17 to an analog signal.

Thus, the system 10 provides a simple and efficient way to adjust an EL lamp to given constant brightness. Once adjusted, then the parameters specific to the lamp are known and full control of the EL lamp is possible.

Another feature of the above-mentioned circuit is the control of end of lamp life by shutting-off the EL lamp 16 based on an age of the EL lamp. The compensated derived voltage to EL lamp should not exceed its withstanding voltage limit, since too high a voltage will induce breakdown and destroy the EL lamp. The microprocessor 17 will stop increasing the output voltage as the measured voltage from the A/D converter 24 reaches the limit value.

Features of the embodiment:

Remaining lamp life at a set brightness level can be displayed on the ballast

Control of the end of lamp life enabling the ability to

Shut off the lamp

Accelerate the decay (brightness) curve

The ability to change the brightness setting at any time with an automatic recalculation of the lamp's decay parameters The ability to utilize the ballast on different sized lamps (within the ballast specification ranges) and have the ballast automatically understand the brightness parameters The ability to reuse the ballast as the lamps are changed or expire The ability to receive a manual (brightness control knob or switch, etc) request to change brightness or an automated (program command) request for a required brightness setting and adjust accordingly and maintain the brightness requirement Thus, with the embodiment, a microprocessor controls the inverter in accordance with a table containing measuring data and appropriate derive voltage to maintain constant brightness of an EL lamp.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A lighting device comprising:

an electro-luminescent (EL) lamp; and

A ballast for controlling brightness of the electro-luminescent (EL) lamp, the ballast comprising:

a converter circuit that converts line AC voltage to a DC input voltage, an inverter circuit that inverts the DC input voltage to an AC output voltage, the ballast being constructed and arranged to provide the AC output voltage to the EL lamp, an input voltage detector constructed and arranged to measure the DC input voltage (Vin), an output voltage detector constructed and arranged to measure the AC output voltage (Vout), and a processor constructed and arranged to adjust Vin based on a ratio of measured values of Vout and Vin to thereby adjust brightness of the EL lamp.

2. The ballast of claim 1, wherein the inverter circuit is a half bridge, self-excited series resonance-parallel loaded circuit.

3. The ballast of claim 1, in combination with the EL lamp.

4. The ballast of claim 1, wherein a look-up table is associated with the processor, the look-up table including a quality factor Q, where Q is related to Vout/Vin, and Q relates to an age of the EL lamp.

5. The ballast of claim 4, wherein the processor is constructed and arranged to calculate Q and adjust Vin based on the look-up table.

6. The ballast of claim 4, wherein the look-up table is provided in memory of the processor.

7. A method of providing illumination, comprising:
 providing an electro-luminescent (EL) lamp,
 providing a ballast for powering the EL lamp,
 measuring DC input voltage (Vin) to the ballast,
 measuring AC output voltage (Vout) from the ballast, and
 adjusting Vin based on a ratio of measured values of Vout and Vin to thereby adjust brightness of the EL lamp.

8. The method of claim 7, wherein the method further includes:
 establishing a relationship between age of the EL lamp and a quality value Q, calculating Q, and the step of adjusting Vin includes adjusting Vin based on the relationship between Q and the age of the EL lamp.

9. The method of claim 8, further including controlling an end of lamp life by shutting-off the EL lamp based on an age of the EL lamp.

10. The method of claim 8, thither including controlling an end of lamp life of the EL lamp by accelerating a decay of the brightness of the EL lamp based on an age of the EL lamp.

11. The method of claim 8, further including displaying remaining lamp life at a set brightness level on the ballast.

12. The method of claim 8, wherein the step of adjusting Vin is performed automatically by a controller.

13. The method of claim 8, wherein the step of adjusting Vin is performed manually.

14. The method of claim 8, wherein the relationship is provided in a look-up table associated with a processor, the step of adjusting Vin being performed by the processor.

15. The method of claim 14, wherein the look-up table is provided in memory associated with the processor.

\* \* \* \* \*